(12) United States Patent
Gilmore et al.

(10) Patent No.: US 8,754,890 B2
(45) Date of Patent: Jun. 17, 2014

(54) GRAPHICAL INTERFACE WITH DATA PRESENCE INDICATORS

(75) Inventors: Nina Gilmore, Andover, MA (US);
Chloe Schulze, Worthington, MA (US);
Daniel Workman, Acton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 821 days.

(21) Appl. No.: 12/533,824

(22) Filed: Jul. 31, 2009

(65) Prior Publication Data

US 2011/0025717 A1 Feb. 3, 2011

(51) Int. Cl.
*G06T 11/20* (2006.01)
*G06F 3/0481* (2013.01)
*G06T 11/40* (2006.01)

(52) U.S. Cl.
CPC ........... *G06F 3/0481* (2013.01); *G06T 11/206* (2013.01); *G06T 11/203* (2013.01); *G06T 11/40* (2013.01)
USPC ...... 345/440; 345/440.1; 345/440.2; 345/441; 345/442; 345/419; 715/763; 715/784; 715/786

(58) Field of Classification Search
CPC ... G06F 3/0481; G06T 11/206; G06T 11/203; G06T 11/40
USPC ........... 345/440–442, 419; 715/763, 784–786
See application file for complete search history.

(56) References Cited

U.S. PATENT DOCUMENTS

| | | | | |
|---|---|---|---|---|
| 5,454,104 A * | 9/1995 | Steidlmayer et al. | ................. | 1/1 |
| 5,491,781 A * | 2/1996 | Gasperina | ..................... | 715/786 |
| 5,553,225 A * | 9/1996 | Perry | ............................ | 715/786 |
| 5,784,067 A * | 7/1998 | Ryll et al. | ..................... | 345/440 |
| 6,204,846 B1 * | 3/2001 | Little et al. | .................... | 715/784 |
| 6,373,483 B1 * | 4/2002 | Becker et al. | ................. | 345/419 |
| 7,458,033 B2 | 11/2008 | Bacigalupi et al. | | |
| 8,082,518 B2 * | 12/2011 | Flake et al. | .................... | 715/786 |
| 2002/0052702 A1 * | 5/2002 | Keller | ............................ | 702/84 |
| 2002/0099743 A1 | 7/2002 | Workman et al. | | |
| 2002/0171646 A1 * | 11/2002 | Kandogan | ..................... | 345/440 |
| 2003/0030634 A1 * | 2/2003 | Sang'udi et al. | ............. | 345/418 |
| 2004/0151704 A1 * | 8/2004 | Berenson et al. | ............ | 424/93.7 |
| 2005/0228735 A1 * | 10/2005 | Duquette | ......................... | 705/37 |
| 2006/0028471 A1 * | 2/2006 | Kincaid et al. | ................ | 345/440 |
| 2006/0164441 A1 * | 7/2006 | Wada et al. | ................... | 345/649 |
| 2006/0265320 A1 * | 11/2006 | Duquette | ........................ | 705/37 |
| 2007/0046674 A1 * | 3/2007 | Sudoh | ........................... | 345/440 |
| 2007/0192744 A1 * | 8/2007 | Reponen | ....................... | 715/833 |

(Continued)

OTHER PUBLICATIONS

Doug McMaster, "A Beginner's Guide to Dojo Charting, Part 2 of 2", Jun. 16, 2008.*
PerkinElmer Life and Analytical Sciences, "PerkinElmer CS Autoplex Analysis Software User Manual", Sep. 2006.*
Eugene Lazutkin, "Zooming, Scrolling, and Panning in Dojo Charting", May 15, 2008.*

(Continued)

*Primary Examiner* — Jin-Cheng Wang
(74) *Attorney, Agent, or Firm* — Miles & Stockbridge P.C.

(57) ABSTRACT

A computer-readable medium, computer-implemented method, and system for generating a user interface is provided. One or more data presence indicators are generated which allows users to locate data on a graph displayed in the user interface by indicating where data is present, even when the data itself is not visible in the user interface. The system can modify the format of the data presence indicator depending on the location of the data. In one embodiment of the invention, the system can update the data presence indicators in response to a user modification of the magnification or scroll position of the user interface.

20 Claims, 10 Drawing Sheets

(56) References Cited

U.S. PATENT DOCUMENTS

| | | | |
|---|---|---|---|
| 2008/0034316 A1* | 2/2008 | Thoresson | 715/781 |
| 2008/0163085 A1* | 7/2008 | Subbu et al. | 715/763 |
| 2009/0147011 A1* | 6/2009 | Buck et al. | 345/501 |
| 2009/0267946 A1* | 10/2009 | Agutter et al. | 345/440 |
| 2009/0292652 A1* | 11/2009 | Duquette | 705/36 R |
| 2010/0015100 A1* | 1/2010 | Xu | 424/93.7 |

OTHER PUBLICATIONS

"ScrollPlot-Scrollable X/Y axes", MATLAB Central, pp. 1-4, May 14, 2007.*

Yahoo! Finance; Yahoo! Finance Chart Basics, http://biz.yahoo.com/charts/guide1.html, Dec. 5, 2006.

Google Code; Google Maps API, http://code.google.com/apis/maps/documentation/controls.html, Sep. 5, 2007.

* cited by examiner

GRAPHICAL INTERFACE WITH DATA PRESENCE INDICATORS

FIELD

One embodiment is directed generally to a computer system, and in particular to a computer system that provides for graphical analysis of data.

BACKGROUND

Computer systems can be utilized to display data in a graphical format. For example, the information may be displayed by the computer system in a graph visible to the user. The computer system may further provide a user interface which allows the user to magnify the view of the graphical data. However, if the user magnifies a portion of the graph which does not include any data, this may result in a scenario where none of the data is visible to the user, because the data is located outside the magnified view displayed to the user. In this scenario, most user interfaces do not provide any indication to the user as to where the data is located. Thus, the user must resort to methods such as exploratory scrolling, or shrinking the view, to relocate the data. Certain user interfaces may provide a separate window which presents a high-level overview of the data. However, this separate window takes up space which could be used to display the magnified view of the graphical data.

SUMMARY

One embodiment of the invention is directed to a system for generating a user interface which displays data presence indicators. The system can include a processor configured to, for each point of a set of points along a first axis of a data graph, display a first data presence indicator in a first format when data is present along a first line which intersects the point, and the data is within a first region, wherein the first line is parallel to the second axis. The processor can be further configured to, for each point of the set of points along the first axis of the data graph, display the first data presence indicator in a second format when the data is present along the first line, and the data is not within the first region. The processor can be further configured to, for each point of a set of points along a second axis of the data graph, display a second data presence indicator in a third format when data is present along a second line which intersects the point and the data is within a second region, wherein the second line is parallel to the first axis. The processor can be further configured to, for each point of the set of points along the second axis of the data graph, display the second data presence indicator in a fourth format when the data is present along the second line and the data is not within the second region.

BRIEF DESCRIPTION OF THE DRAWINGS

Further embodiments, details, advantages, and modifications will become apparent from the following detailed description of the preferred embodiments, which is to be taken in conjunction with the accompanying drawings, wherein.

DETAILED DESCRIPTION

One embodiment of the invention is directed to a system for generating a user interface. The user interface includes one or more data presence indicators which allows users to locate data on a graph displayed in the user interface by indicating where data is present, even when the data itself is not visible in the user interface. The system uses different formats to display the data presence indicator depending on the location of the data. In one embodiment of the invention, the system dynamically updates the data presence indicators in response to a user modification of the magnification or scroll position of the user interface.

Figure 1:
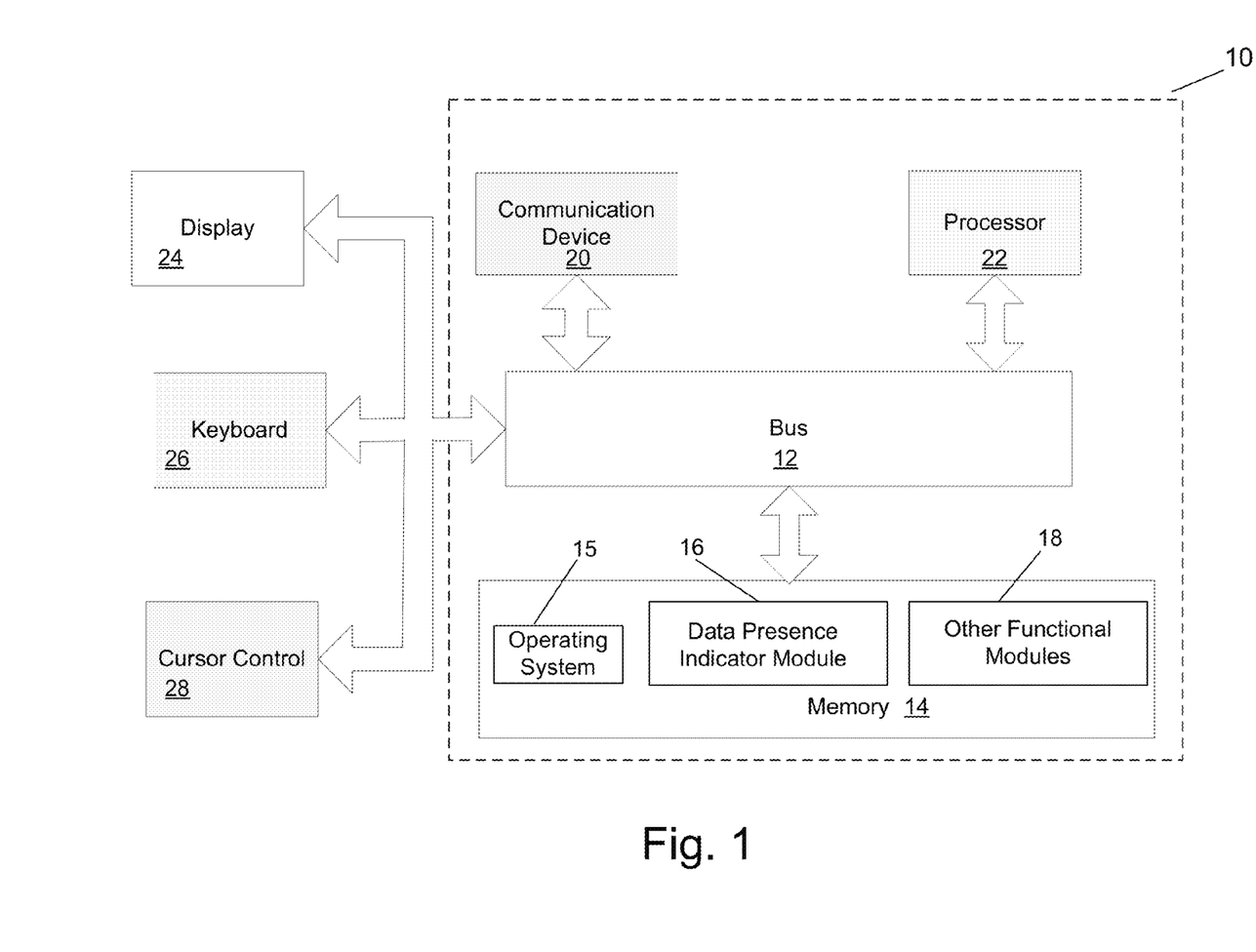
FIG. 1 illustrates a block diagram of a user interface system that may implement an embodiment of the present invention.

FIG. 1 illustrates a block diagram of a system 10 that may implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. Computer-readable medium may include both volatile and nonvolatile media, removable and non-removable media, communication media, and storage media. Communication media may include computer readable instructions, data structures, program modules or other data in a modulated data signal such as a carrier wave or other transport mechanism, and may include any information delivery media. Storage media may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user, such as graph data. A keyboard 26 and a cursor control device 28, such as a computer mouse, can also be operatively coupled to bus 12 to enable the user to interface with system.

According to one embodiment, memory 14 can store software modules that may provide functionality when executed by processor 22. The modules can include an operating system 15, a data presence indicator module 16, as well as other functional modules 18. Operating system 15 can provide an operating system functionality for system 10. Data presence indication module 16 generates one or more data presence indicators, as will be described in more detail below. System 10 can also be part of a larger system. Thus, system 10 can include one or more additional functional modules 18 to include the additional functionality. For example, functional modules 18 may include business intelligence and analytic modules that are part of the "Business Intelligence" product from Oracle Corporation.

Figure 2:
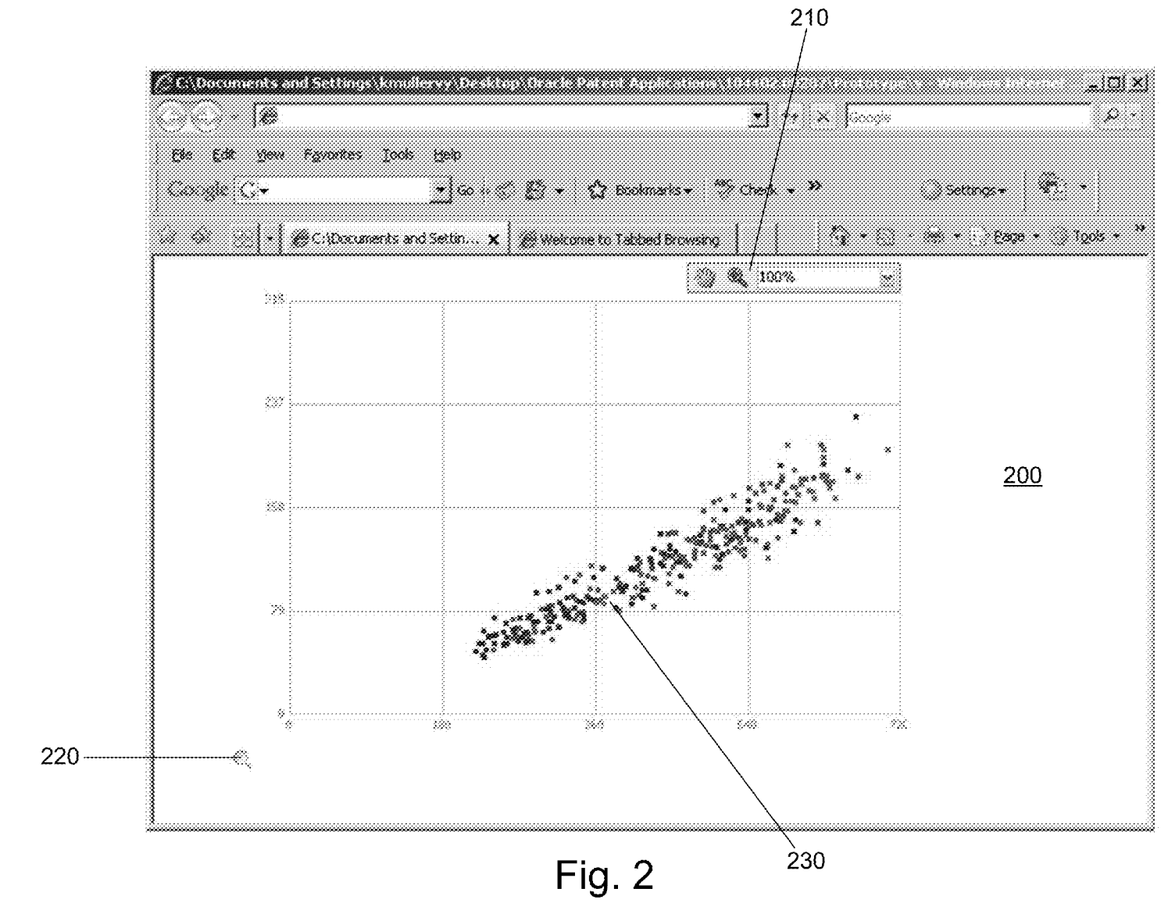
FIG. 2 illustrates a user interface in accordance with one embodiment of the invention.

FIG. 2 illustrates an example of a user interface 200, according to one embodiment of the invention. In the illustrated example, user interface 200 displays a data graph to a user that includes data 230. In this embodiment, the data graph is a two-axis scatter graph. However, one of ordinary skill in the art would understand that other embodiments may include other types of graphs, such as a scatter graph with a single axis or three axes, or a bubble graph, while remaining within the scope of the invention. At various coordinates of the scatter graph, user interface 200 displays data 230 to indicate to the user that data is present at that specific coordinate. User interface 200 also displays one or more zoom buttons (e.g. zoom buttons 210 and 220), identified in user interface 200 as a magnifying glass according to the embodiment, which allows the user to magnify or shrink the view of the data graph by a specific factor.

Figure 3:
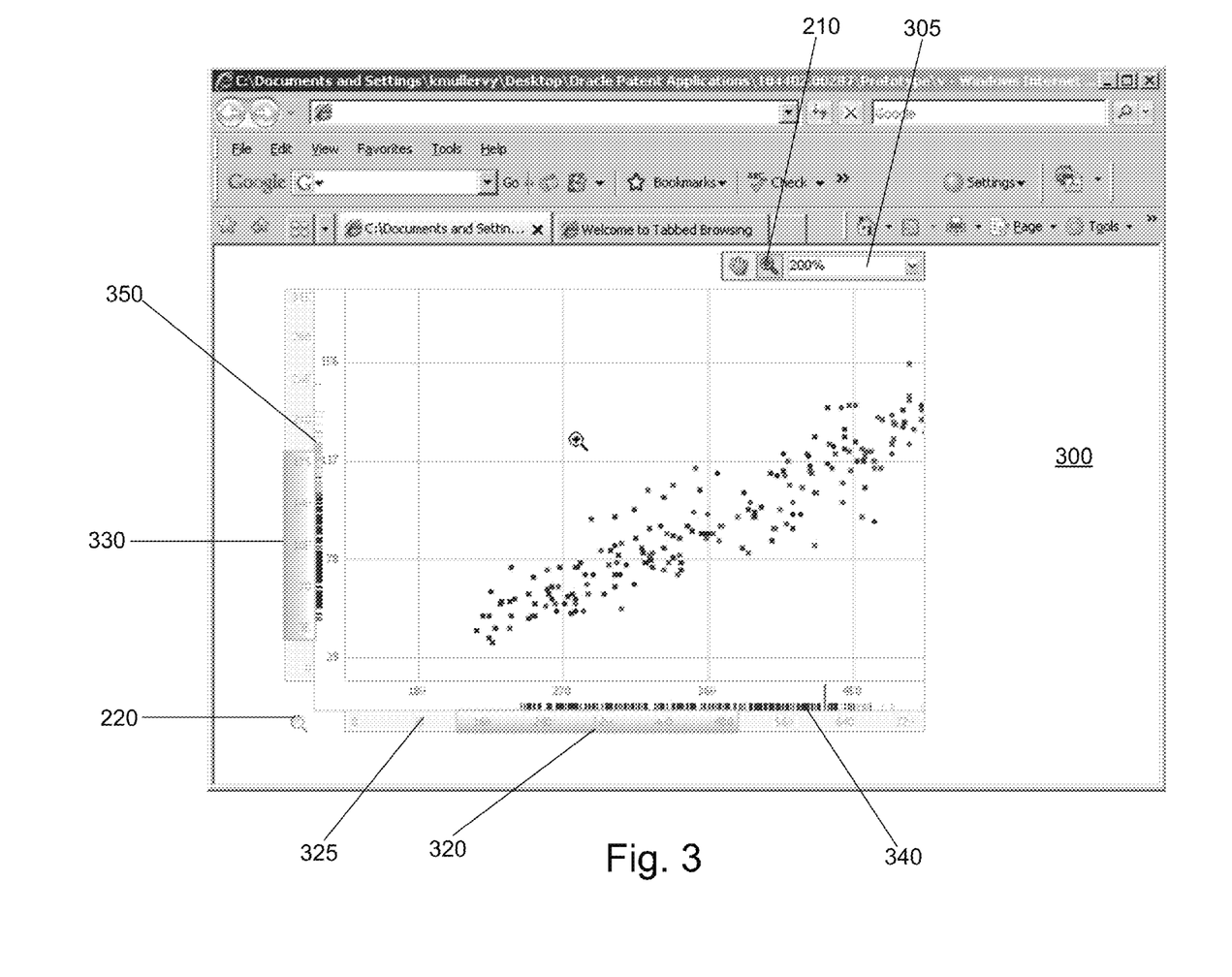
FIG. 3 illustrates a user interface in accordance with one embodiment of the invention, after a user has modified the view by increasing the magnification.

FIG. 3 illustrates an example of a user interface 300, according to one embodiment of the invention. In the illustrated example, user interface 300 is similar to user interface 200, but user interface 300 now displays a magnified view of the data graph in response to the user clicking zoom button 210, and clicking a region of the data graph, thus magnifying the view by 200% as indicated in field 305. As can be seen in FIG. 3, only a portion of data 202 displayed in user interface 200 of FIG. 2 is visible in the magnified view displayed in user interface 300. The remainder of the data is located outside the magnified view.

In the magnified view, user interface 300 also automatically displays a horizontal scroll bar 320, a vertical scroll bar 330, and data presence indicators 340 and 350. Horizontal scroll bar 320 indicates to the user the region along the horizontal axis (i.e., x-axis) that user interface 300 is displaying in the magnified view and allows the user to horizontally scroll the magnified view to view portions of the graph that are not visible in the initial magnified view displayed by user interface 300. According to the embodiment, the region is further indicated in numerical scale 325. Likewise, vertical scroll bar 330 indicates to the user the region along the vertical axis (i.e., y-axis) that user interface 300 is displaying in the magnified view and allows the user to vertically scroll the magnified view to view portions of the graph that are visible in the initial magnified view.

Data presence indicators 340 and 350 indicate to the user the presence of data on the data graph displayed by user interface 300. More particularly, data presence indicators 340 and 350 indicate to the user whether the data is visible in the current magnified view displayed by user interface 300 or not. As will be described below in more detail, user interface 300 can dynamically/automatically update data presence indicators 340 and 350 based upon the magnification of the view selected by the user via zoom button 210 and the current geographical position of the view selected by the user via horizontal scroll bar 320 and vertical scroll bar 330.

User interface 300 can be configured to display a data presence indicator in a format for each point in a given set of points along the horizontal axis. In the embodiment illustrated in FIG. 3, the set of points along the horizontal axis starts at 0 and completes at 720. However, one or ordinary skill in the art would readily understand that the set of points along the horizontal axis could be any length. In the embodiment, the data presence indicators for the set of points along the horizontal axis, are represented by data presence indicators 340. Each data presence indicator of the data presence indicators 340 is represented by a vertical line that user interface 300 displays to a user. However, one of ordinary skill in the art would understand that user interface 300 can display any type of visual representation of data presence indicators 340, and still be within the scope of the invention.

User interface 300 can also be configured to display a data presence indicator in a format for each point in a given set of points along the vertical axis. In the embodiment illustrated in FIG. 3, the set of points along the vertical axis starts at 0 and completes at 315. However, one of ordinary skill in the art would readily understand that the set of points along the vertical axis could be any length. In the embodiment, the data presence indicators for the set of points along the vertical axis, are presented by data presence indicators 350. Each data presence indicator of data presence indicators 350 is represented by a horizontal line that user interface 300 displays to a user. However, one of ordinary skill in the art would understand that user interface 300 can display any type of visual representation of data presence indicators 350, and still be within the scope of the invention.

In order to display data presence indicators 340, user interface 300 is configured, for each point in the given set of points along the horizontal axis, to determine whether data is present along a vertical line which intersects each point in the given set of points along the horizontal axis. If there is no data present along the vertical line, user interface 300 does not display a data presence indicator for the correlated point in the given set of points along the horizontal axis. If there is data present along the vertical line, user interface 300 then determines whether data is present in the region along the vertical axis which is currently being displayed by user interface 300. If the data is in the region, user interface 300 displays the data presence indicator in a first format. If the data is not in the region, user interface 300 displays the data presence indicator in a second format.

In the embodiment illustrated in FIG. 3, for each point in the set of points from 0 to 720 along the horizontal axis, user interface 300 determines if data is present along a vertical line which intersects each point in the given set of points along the horizontal axis. As shown in FIG. 3, user interface 300 determines if data is present along a vertical line that intersects point 0, a vertical line that intersects point 1, a vertical line that intersects point 2, etc., up to and including a vertical line that intersects point 720. For each point where data is present, user interface 300 also determines if data is present in the region along the vertical axis which is currently being displayed. As shown in FIG. 3, this region is represented by vertical scroll bar 330. If data is present and is in the region along the vertical axis which is currently being displayed, user interface 300 displays the data presence indicator as a black vertical line. If data is present, but is not in the region along the vertical axis which is currently being displayed, user interface 300 displays the data presence indicator as a grey vertical line. If there is no data present, user interface 300 does not display a data presence indicator. As discussed previously, the data presence indicators associated with the set of points along the horizontal axis are represented in FIG. 3 by data presence indicators 340.

In order to display data presence indicators 350, user interface 300 is configured, for each point in the given set of points along the vertical axis, to determine whether data is present along a horizontal line which intersects each point in the given set of points along the vertical axis. If there is no data present along the horizontal line, user interface 300 does not display a data presence indicator for the correlated point in the given set of points along the vertical axis. If there is data present along the horizontal line, user interface 300 then determines whether data is present in the region along the horizontal axis which is currently being displayed by user interface 300. If the data is in the region, user interface 300 displays the data presence indicator in a third format. If the data is not in the region, user interface 300 displays the data presence indicator in a fourth format.

In the embodiment illustrated in FIG. 3, for each point in the set of points from 0 to 315 along the vertical axis, user interface 300 determines if data is present along a horizontal line which intersects each point in the given set of points along the vertical axis. As shown in FIG. 3, user interface 300 determines if data is present along a horizontal line that intersects point 0, a horizontal line that intersects point 1, a horizontal line that intersects point 2, etc., up to and including a horizontal line that intersects point 315. For each point where data is present, user interface 300 also determines if data is present in the region along the horizontal axis which is currently being displayed. As shown in FIG. 3, this region is represented by horizontal scroll bar 320. If data is present and is in the region along the horizontal axis which is currently being displayed, user interface 300 displays the data presence indicator as a black horizontal line. If data is present, but is not in the region along the vertical axis which is currently being displayed, user interface 300 displays the data presence indicator as a grey horizontal line. If there is no data present, user interface 300 does not display a data presence indicator. As discussed previously, the data presence indicators associated with the set of points along the vertical axis are represented in FIG. 3 by data presence indicators 350.

While the format used by user interface 300 to indicate that data is present in the region along the respective axis is black, and the format used by user interface 300 to indicate that data is not present in the region along the respective axis is grey in the embodiment described, one of ordinary skill in the art would understand that the user interface 300 may use any type of format in displaying the data presence indicators to indicate to the user whether data is or is not present in the region along the respective axis without deviating from the scope of the invention. For example, the user interface 300 may use colors other than black and grey, such as red, yellow, orange, green, blue, purple, violet, etc. as the format to display the data presence indicators. As another example, instead of using different colors to display the data presence indicators, user interface 300 may use different symbols, shapes, markings, or other visual configurations as a format in displaying the data presence indicators to indicate whether data is or is not present in the region along the respective axis.

User interface 300 can also be configured, for each point in the given set of points along the horizontal axis, to determine whether data is present at multiple points along the vertical line which intersects each point in the given set of points along the horizontal axis. If the data is present at multiple points along the vertical line, user interface 300 can be configured to modify the format of the data presence indicators to indicate to the user that the data is present at multiple points. For example, as shown in data presence indicators 340 in FIG. 3, where the data is present at multiple points along the vertical line which intersects a point in the given set of points along the horizontal axis, user interface 300 displays a data presence indicator which has a length that is greater than the length of the other data presence indicators (e.g. at point 602 of the horizontal axis).

Likewise, user interface 300 can also be configured, for each point in the given set of points along the vertical axis, to determine whether data is present at multiple points along the horizontal line which intersects each point in the given set of points along the vertical axis. If the data is present at multiple points along the horizontal line, user interface 300 can be configured to modify the format of the data presence indicator to indicate to the user that the data is present at multiple points. For example, as shown in the data presence indicators 350 in FIG. 3, where the data is present at multiple points along the horizontal line which intersects a point in the given set of points along the vertical axis, user interface 300 displays a data presence indicator which has a length that is greater than the length of the other data presence indicators (e.g., at point 219 of the vertical axis).

While the manner used by user interface 300 to modify the format of the data presence indicator, in order to indicate that the data is present at multiple points, is to lengthen the corresponding data presence indicator of data presence indicators 340 and 350 in the embodiment described, one of ordinary skill in the art would understand that the user interface 300 may modify the data presence indicator in any manner. For example, the user interface 300 may modify the format of data presence indicators 340 and 350 by shortening the data presence indicator, changing the color of the data presence indicator, changing the shape of the data presence indicator, or some other similar modification.

Figure 4:
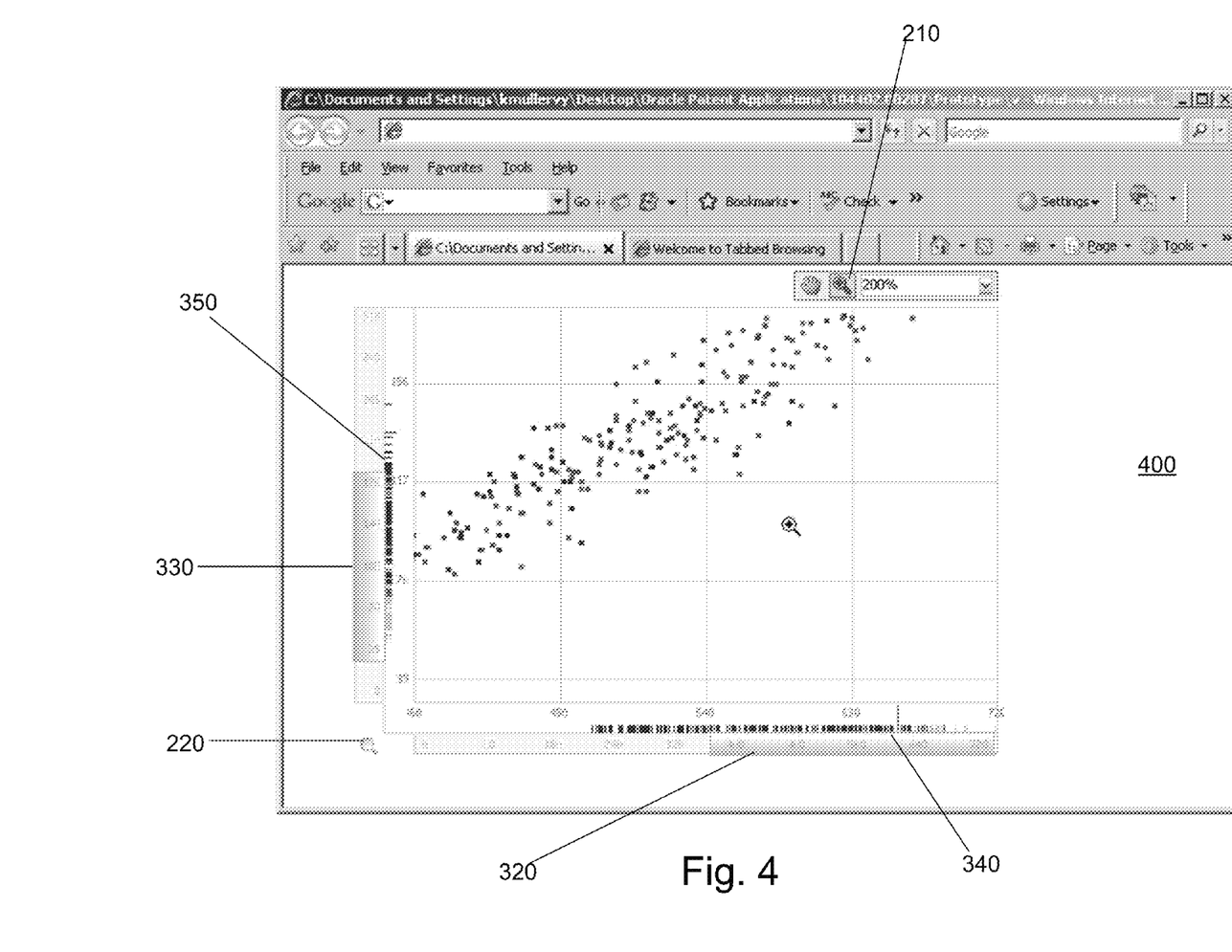
FIG. 4 illustrates a user interface in accordance with one embodiment of the invention, after a user has modified the view by scrolling the scroll bar along the horizontal axis.

FIG. 4 illustrates an example of a user interface 400, according to one embodiment of the invention. In the illustrated example, the user has clicked on horizontal scroll bar 320 and moved horizontal scroll bar 320 a distance to the right. This has the effect of scrolling the view of the data graph in a horizontal direction so that the view of the data graph is to the right of the view shown in FIG. 3. User interface 400 can be configured to dynamically redisplay the data of the data graph based on the modified view of the data graph. As previously discussed, user interface 400 can also be configured to dynamically update data presence indicators 350 in response to the user moving horizontal scroll bar 320 to the right. Specifically, user interface 400 redisplays the data presence indicators 350 based on the criteria discussed above in relation to FIG. 3. As can be seen in FIG. 4, in this embodiment, the redisplaying of data presence indicators results in some of data presence indicators 350 changing from grey to black, and visa-versa, based on the redisplayed data of the data graph.

Figure 5:
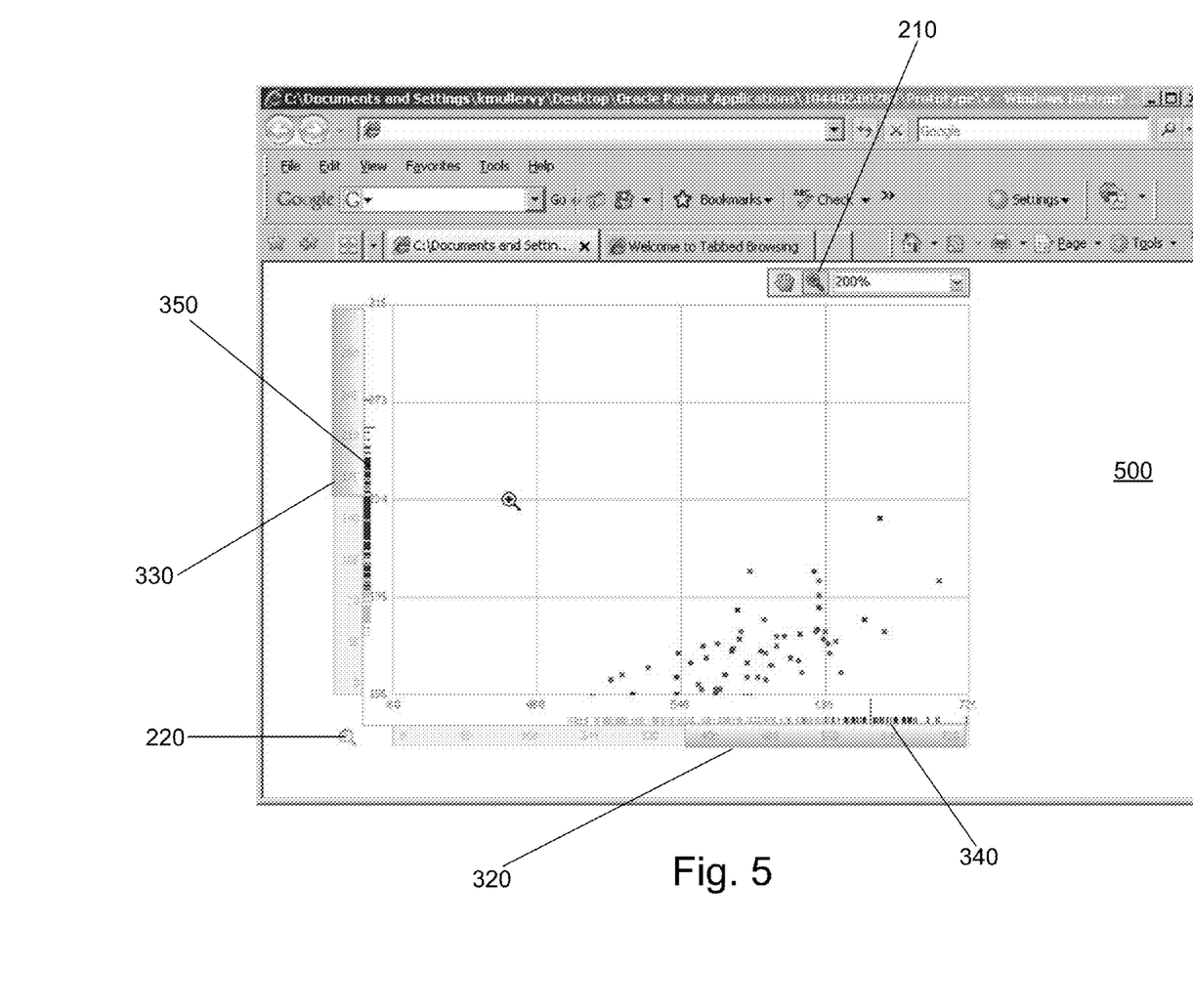
FIG. 5 illustrates a user interface in accordance with one embodiment of the invention, after a user has modified the view by scrolling the scroll bar along the vertical axis.

FIG. 5 illustrates an example of a user interface 500, according to one embodiment of the invention. In the illustrated example, the user has clicked on vertical scroll bar 330 and moved vertical scroll bar 330 a distance upwards. This has the effect of scrolling the view of the data graph in a vertical direction so that the view of the data graph is above the view shown in FIG. 4. As previously discussed, user interface 500 can be configured to dynamically update data presence indicators 340 in response to the user moving vertical scroll bar 330 in an upwards direction. Specifically, user interface 500 redisplays data presence indicators 340 based on the criteria discussed above in relation to FIG. 3. As can be seen in FIG. 5, in this embodiment, the redisplaying of data presence indicators results in some of the data presence indicators 340 changing from grey to black, and visa-versa, based on the redisplayed data of the data graph.

Figure 6:
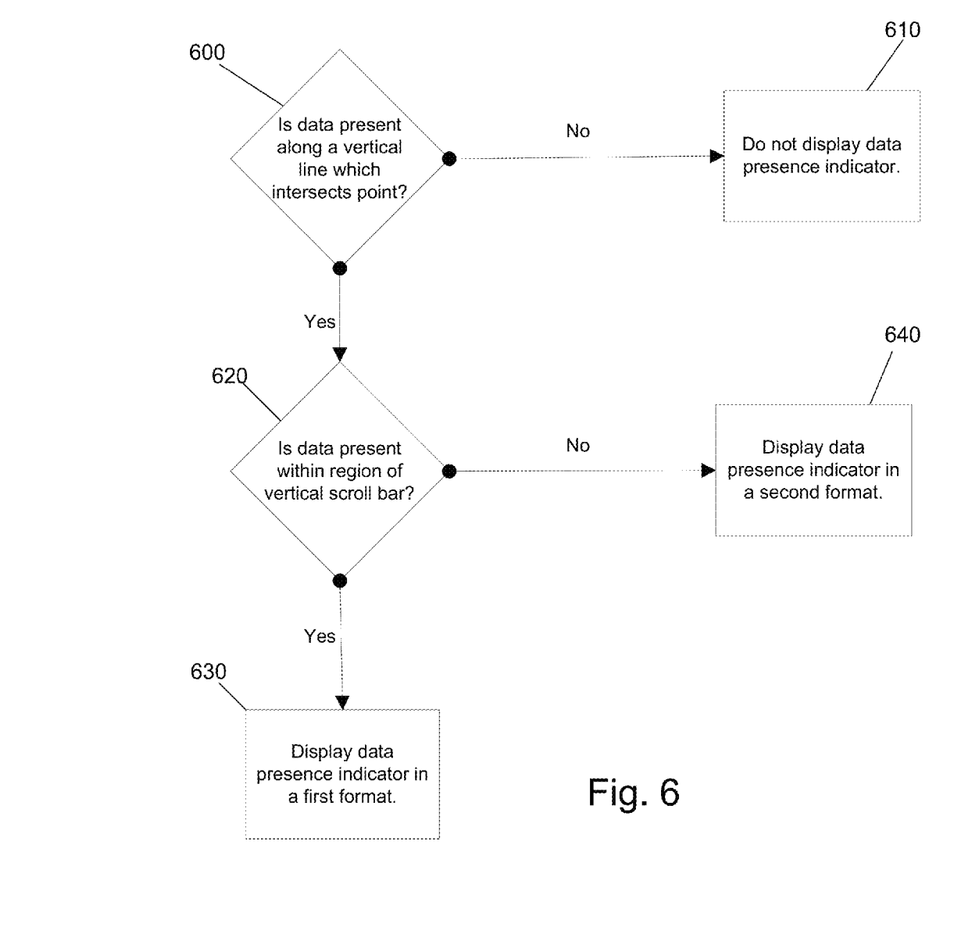
FIG. 6 illustrates a flow diagram for a process of displaying data presence indicators along a vertical axis in accordance with one embodiment of the invention.

FIG. 6 illustrates a flow diagram of the functionality of data presence indicator module 16 of system 100 in displaying data presence indicators along a vertical axis, according to one embodiment of the invention. In one embodiment, the functionality of the flow diagram of FIG. 6, FIG. 7, and FIG. 10 described below, is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, the functionality is used by user interfaces 200, 300, 400, and 500, of FIGS. 2-5.

At 600, for a given point in a set of points along a horizontal axis of a data graph, it is determined whether data is present along a vertical line which intersects the point. If data is not present, the process moves to 610, where a data presence indicator for the given point is not displayed. If data is present, the process moves to 620, when it is determined whether data is present within the region of the vertical scroll bar of the data graph. If data is present within the region, the process moves to 630, where the data presence indicator is displayed as a black horizontal line (i.e., in a first format). If data is not present within the region, the process moves to 640, where the data presence indicator is displayed as a grey horizontal line (i.e., in a second format). According to the embodiment, the process is performed on each point in the set of points along the horizontal axis of the data graph.

Figure 7:
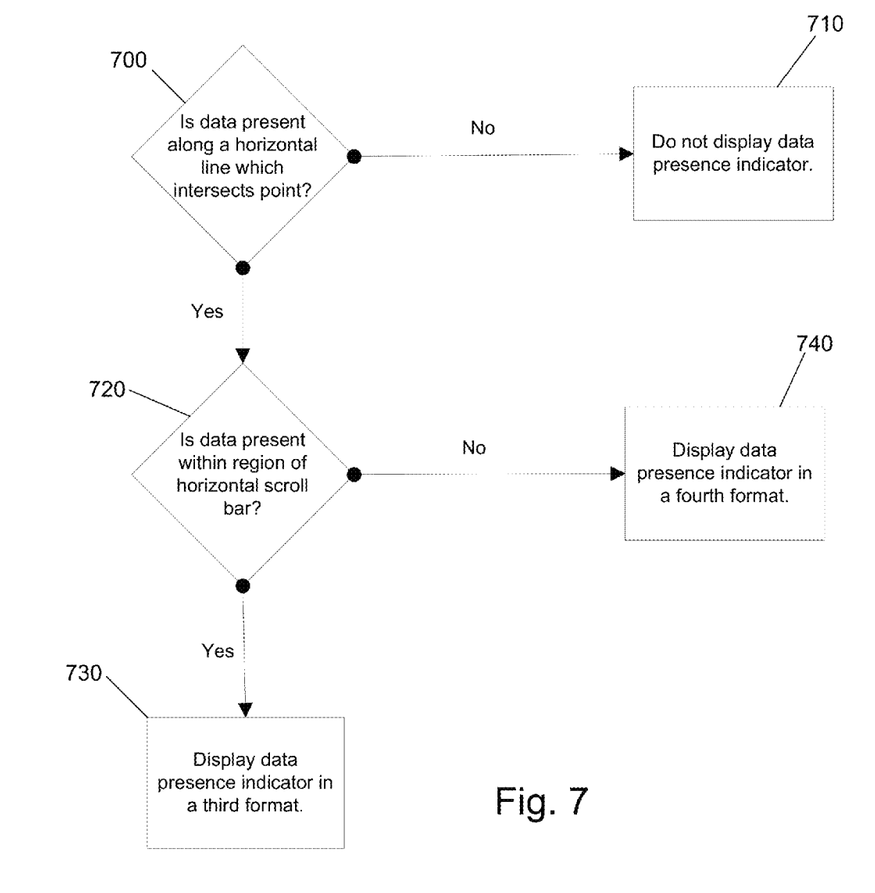
FIG. 7 illustrates a flow diagram for a process of displaying data presence indicators along a horizontal axis in accordance with one embodiment of the invention.

FIG. 7 illustrates a flow diagram of the functionality of data presence indicator module 16 of system 100 in displaying data presence indicators along a horizontal axis, according to one embodiment of the invention. One of ordinary skill in the art would understand that the functionality of FIG. 6 and FIG. 7 may be done serially or in parallel and still fall within the scope of the invention.

At 700, for a given point in a set of points along a vertical axis of a data graph, it is determined whether data is present along a horizontal line which intersects the point. If data is not present, the process moves to 710, where a data presence indicator for the given point is not displayed. If data is present, the process moves to 720, where it is determined whether data is present within the region of the horizontal scroll bar of the data graph. If data is present within the region, the process moves to 730, where the data presence indicator is displayed as a black vertical line (i.e., in a third format). If data is not present within the region, the process moves to 740, where the data presence indicator is displayed as a grey vertical line (i.e., in a fourth format). According to the embodiment, the process is performed on each point in the set of points along the vertical axis of the data graph.

As a result of certain embodiments of the invention, a user always knows where on the data graph data is located, even when the view of the data graph is highly magnified, and no data is visible to the user in the view. This allows the user to remain focused on a task, such as interacting with the graph data, rather than forcing the user to zoom out and zoom back in again because the user has lost the context of the data graph, or because the user cannot remember where the view is located in the overall dataset. Furthermore, as a result of certain embodiments of the invention, a user can recover from the occasion when they have inadvertently scrolled all data off-screen, and they do not know where to navigate on the data graph to view the data. Because the data presence indicators are always visible and highlight where on each axis the graph data is located, a user can easily scroll to the location in question without interrupting their workflow.

Figure 8:
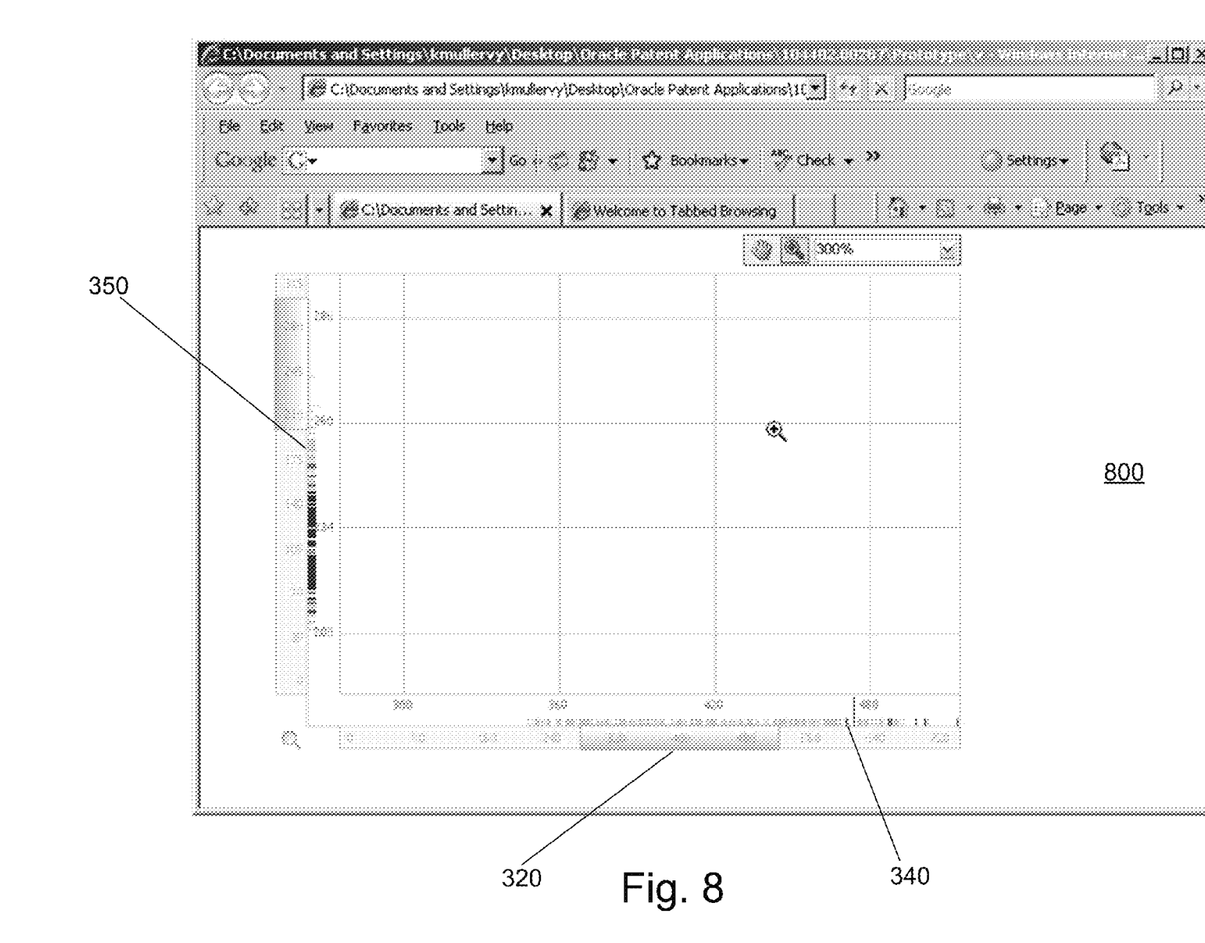
FIG. 8 illustrates a user interface in accordance with one embodiment of the invention, after a user has modified the view by increasing the magnification so that no data is visible in the view.
Figure 9:
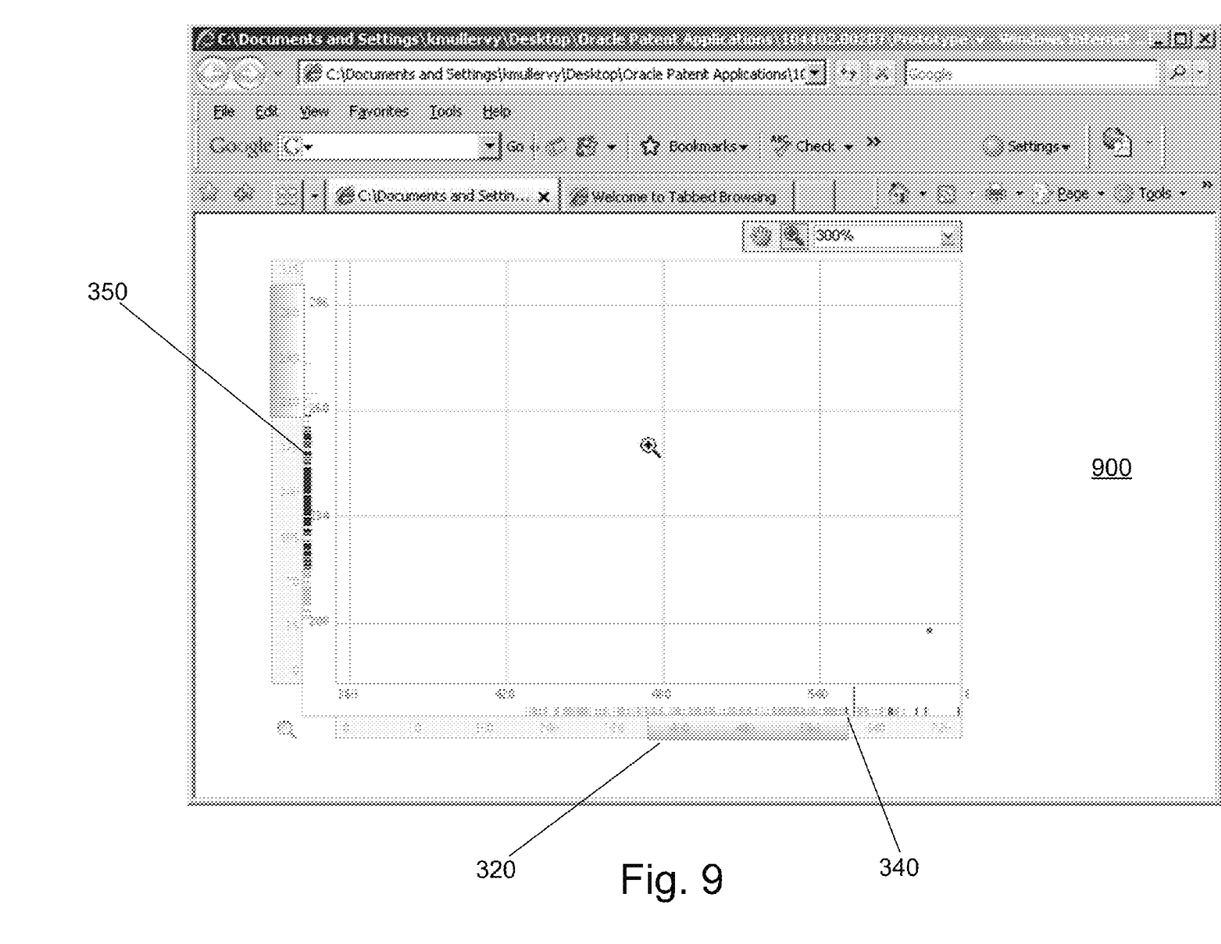
FIG. 9 illustrates a user interface in accordance with one embodiment of the invention, after a user has modified the magnified view by scrolling the scroll bar along the horizontal axis so that data is visible within the new magnified view.

FIGS. 8 and 9 further illustrate the advantages of the data presence indicators of certain embodiments of the invention. FIG. 8 illustrates an example of a user interface 800, according to one embodiment of the invention. In this embodiment, the user has zoomed into a region of the data graph where no data is visible. However, data presence indicators 340 and 350 allow the user to navigate to a region of the data graph where data is visible. For example, data presence indicators 340 and 350 indicate to the user through the use of black and grey lines, which points along the respective axis include data. Based on data presence indicators 340 and 350, the user can scroll either horizontal bar 320 or vertical bar 330 in a direction so that one or more black lines are within the region of horizontal bar 320, or vertical bar 330 or both.

FIG. 9 illustrates an example of a user interface 900, according to one embodiment of this invention. In this embodiment, the user has moved from the region illustrated in FIG. 8 by moving horizontal scroll bar 320 to the right. As shown in FIG. 9, the user has found a region where data 230 is visible due to data presence indicators 340 by scrolling horizontal scroll bar 320 in a direction until one or more black lines fall within the region of horizontal scroll bar 320. Thus, the user is able to locate data 230 on the data graph without having to zoom out and zoom back in again. Although not shown, in an alternative embodiment, the user can also scroll vertical scroll bar 330 in a vertical direction using data presence indicators 350 until one or more black lines fall within the region of vertical scroll bar 330 in order to locate data.

As described above, an embodiment is a system for generating one or more data presence indicators which allows users to locate data by indicating where data is present, even when the data itself is not visible to the user. Thus a user is always able to locate data, even when the data is not immediately visible to the user.

Figure 10:
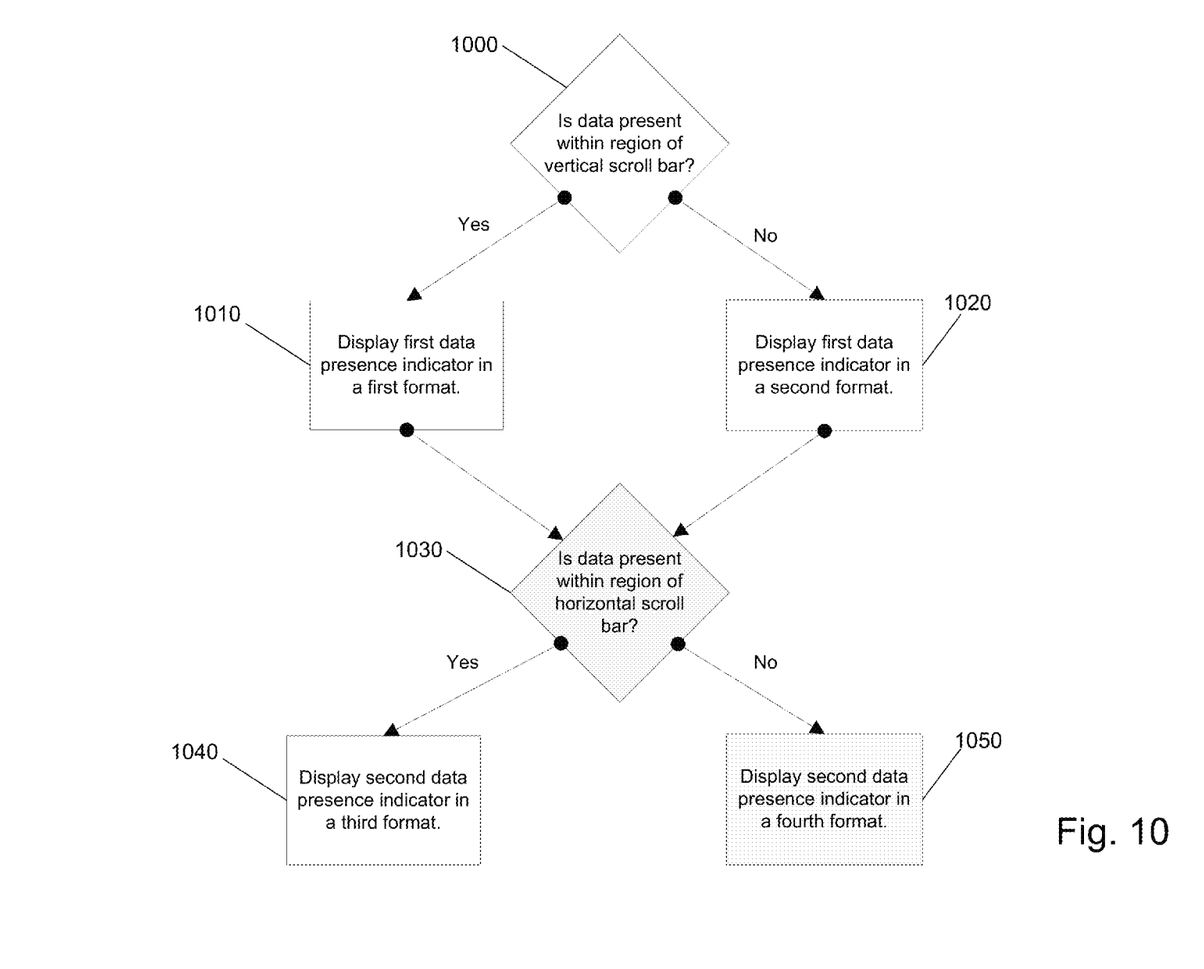
FIG. 10 illustrates a flow diagram for a process of displaying data presence indicators along both a vertical axis and a horizontal axis in accordance with one embodiment of the invention.

FIG. 10 illustrates a flow diagram of the functionality of data presence indicator module 16 of system 100 in displaying data presence indicators on a data graph, according to one embodiment of the invention. The flow diagram of FIG. 10 illustrates an embodiment which is an alternative embodiment from the flow diagrams of FIG. 6 and FIG. 7. In the flow diagrams of FIG. 6 and FIG. 7, the system 100 does not know the coordinates of the data present in the data graph, and thus, must first locate each data point before displaying the appropriate data presence indicators. However, in the embodiment illustrated in FIG. 10, the system 100 already knows the coordinates of the data present in the data graph, and displays the data presence indicators accordingly.

At 1000, for a data point in a set of data points of a data graph, it is determined whether the data point is present within a region of a vertical scroll bar of the data graph. If the data point is present within the region, the process moves to 1010, where a first data presence indicator is displayed as a black horizontal line (i.e., in a first format). If the data point is not present within the region, the process moves to 1020, where the first data presence indicator is displayed as a grey horizontal line (i.e., in a second format). Regardless of whether the process moved to 1010 or 1020, the process moves to 1030, where it is determined whether the data point is present within a region of a horizontal scroll bar of the data graph. If the data point is present within the region, the process moves to 1040, where a second data presence indicator is displayed as a black vertical line (i.e., in a third format). If the data point is not present within the region, the process moves to 1050, where the second data presence indicator is displayed as a grey vertical line (i.e., in a fourth format). According to the embodiment, the process is performed on each data point in the set of data points in the data graph.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to generate a user interface for displaying data presence indicators, the generating comprising:
    displaying a graph, wherein the graph comprises a first axis, a second axis, a first scroll bar, a second scroll bar, and one or more data points, wherein the first scroll bar is displayed along the first axis, and the second scroll bar is displayed along the second axis;
    for each data point in the graph, displaying a first data presence indicator that indicates a position of the data point in the graph in a first format at a position along the first axis, when the data point is within a region represented by the second scroll bar;
    for each data point in the graph, displaying the first data presence indicator in a second format at a position along the first axis, when the data point is not within the region represented by the second scroll bar;
    for each data point in the graph, displaying a second data presence indicator that indicates the position of the data point in the graph in a third format at a position along the second axis, when the data point is within a region represented by the first scroll bar; and
    for each data point in the graph, displaying the second data presence indicator in a fourth format at a position along the second axis, when the data point is not within the region represented by the first scroll bar;
    wherein, for at least one data point in the graph, the at least one first data presence indicator and the at least one second data presence indicator that correspond to the at least one data point indicate a position of the at least one data point in the graph, when the at least one data point is not visible within the user interface.

2. The non-transitory computer-readable medium of claim 1, the generating further comprising:
    for each data point in the graph, displaying the first data presence indicator in a fifth format when one or more additional data points are present along a first line which intersects the data point, wherein the first line is parallel to the second axis of the graph; and
    for each data point in the graph, displaying the second data presence indicator in a sixth format when one or more additional data points are present along a second line which intersects the data point, wherein the second line is parallel to the first axis of the graph.

3. The non-transitory computer-readable medium of claim 2,
    wherein the first format and the third format each comprise a black line,
    wherein the second format and the fourth format each comprise a grey line,
    wherein the fifth format comprises a black line of greater length than the length of the first format and third format, and
    wherein the sixth format comprises a grey line of greater length than the length of the second format and the fourth format.

4. The non-transitory computer-readable medium of claim 1, the generating further comprising:
    for each data point in the graph, updating the first data presence indicator in response to a user modifying a view of the graph; and
    for each data point in the graph, updating the second data presence indicator in response to a user modifying the view of the graph.

5. The non-transitory computer-readable medium of claim 4, wherein the user modifying the view of the graph comprises the user increasing or decreasing the magnification of the view via a zoom button.

6. The non-transitory computer-readable medium of claim 4, wherein the user modifying the view of the graph comprises the user navigating to a different region of the graph via a scrolling bar.

7. The non-transitory computer-readable medium of claim 1,
    wherein the first format and the third format each comprise a black line, and
    wherein the second format and the fourth format each comprise a grey line.

8. The non-transitory computer-readable medium of claim 1, the generating further comprising
    determining a location of each data point in the graph by,
    for each point of a set of points along the first axis of the graph determining whether data is present along a first line which intersects the point, wherein the first line is parallel to the second axis of the graph, and
    for each point of a set of points along the second axis of the graph, determining whether data is present along a second line which intersects the point, wherein the second line is parallel to the first axis of the graph.

9. The non-transitory computer-readable medium of claim 1, wherein the location of each data point is known.

10. A computer-implemented method for generating a user interface which displays data presence indicators, the method comprising:

displaying, by a system comprising a memory and a processor, a graph, wherein the graph comprises a first axis, a second axis, a first scroll bar, a second scroll bar, and one or more data points, wherein the first scroll bar is displayed along the first axis, and the second scroll bar is displayed along the second axis;

for each data point in the graph, displaying, by the system, a first data presence indicator that indicates a position of the data point in the graph in a first format at a position along the first axis, when the data point is within a region represented by the second scroll bar;

for each data point in the graph, displaying, by the system, the first data presence indicator in a second format at a position along the first axis, when the data point is not within the region represented by the second scroll bar;

for each data point in the graph, displaying, by the system, a second data presence indicator that indicates the position of the data point in the graph in a third format at a position along the second axis, when the data point is within a region represented by the first scroll bar; and     for each data point in the graph, displaying, by the system, the second data presence indicator in a fourth format at a position along the second axis, when the data point is not within the region represented by the first scroll bar;

wherein, for at least one data point in the graph, the at least one first data presence indicator and the at least one second data presence indicator that correspond to the at least one data point indicate a position of the at least one data point in the graph, when the data point is not visible within the user interface.

11. The computer-implemented method of claim 10, further comprising:

for each data point in the graph, displaying the first data presence indicator in a fifth format when one or more additional data points are present along a first line which intersects the data point, wherein the first line is parallel to the second axis of the graph; and     for each data point in the graph, displaying the second data presence indicator in a sixth format when one or more additional data points are present along a second line which intersects the data point, wherein the second line is parallel to the first axis of the graph.

12. The computer-implemented method of claim 10, further comprising:

for each data point in the graph, updating the first data presence indicator in response to a user modifying a view of the graph; and     for each data point in the graph, updating the second data presence indicator in response to a user modifying the view of the graph.

13. The computer-implemented method of claim 10, further comprising:

determining a location of each data point in the graph by,     for each point of a set of points along the first axis of the graph determining whether data is present along a first line which intersects the point, wherein the first line is parallel to the second axis of the graph, and     for each point of a set of points along the second axis of the graph, determining whether data is present along a second line which intersects the point, wherein the second line is parallel to the first axis of the graph.

14. The computer-implemented method of claim 10, wherein the location of each data point is known.

15. A system for generating a user interface which displays data presence indicators, the system comprising:

a memory configured to store instructions;

a processor configured to:

display a graph, wherein the graph comprises a first axis, a second axis, a first scroll bar, a second scroll bar, and one or more data points, wherein the first scroll bar is displayed along the first axis, and the second scroll bar is displayed along the second axis;

for each data point in the graph, display a first data presence indicator that indicates a position of the data point in the graph in a first format at a position along the first axis, when the data point is within a region represented by the second scroll bar,     for each data point in the graph, display the first data presence indicator in a second format at a position along the first axis, when the data point is not within the region represented by the second scroll bar,     for each data point in the graph, display a second data presence indicator that indicates the position of the data point on the graph in a third format at a position along the second axis, when the data point is within a region represented by the first scroll bar, and     for each data point in the graph, display the second data presence indicator in a fourth format at a position along the second axis, when the data point is not within the region represented by the first scroll bar;

wherein, for at least one data point in the graph, the at least one first data presence indicator and the at least one second data presence indicator that correspond to the at least one data point indicate a position of the at least one data point in the graph, when the at least one data point is not visible within the user interface.

16. The system of claim 15, wherein the processor is further configured to:

for each data point in the graph, display the first data presence indicator in a fifth format when one or more additional data points are present along a first line which intersects the data point, wherein the first line is parallel to the second axis of the graph; and     for each data point in the graph, display the second data presence indicator in a sixth format when one or more additional data points are present along a second line which intersects the data point, wherein the second line is parallel to the first axis of the graph.

17. The system of claim 15, wherein the processor is further configured to:

for each data point in the graph, update the first data presence indicator in response to a user modifying a view of the graph; and     for each data point in the graph, update the second data presence indicator in response to a user modifying the view of the graph.

18. The system of claim 15, wherein the processor is further configured to:

determine a location of each data point in the graph by,     for each point of a set of points along the first axis of the graph determining whether data is present along a first line which intersects the point, wherein the first line is parallel to the second axis of the graph, and     for each point of a set of points along the second axis of the graph, determining whether data is present along a second line which intersects the point, wherein the second line is parallel to the first axis of the graph.

19. The system of claim 15, wherein the location of each data point is known.

20. A system, comprising:
a memory configured to store instructions;
a processor configured to display a graphical user interface;
wherein the graphical user interface comprises:
a graph;
a vertical axis;
a horizontal axis;
a plurality of data points;
a zoom button configured to change a magnification;
a horizontal scroll bar, wherein the horizontal scroll bar represents a region of the horizontal axis;
a vertical scroll bar, wherein the vertical scroll bar represents a region of the vertical axis,
wherein, upon a change in magnification via the zoom button, the user interface further comprises,
a plurality of horizontal data presence indicators that indicate positions of the plurality of data points in the graph, wherein each horizontal data presence indicator corresponds to a point on the horizontal axis; and
a plurality of vertical data presence indicators that indicate positions of the plurality of data points in the graph, wherein each vertical data presence indicator corresponds to a point on the vertical axis,
wherein, when at least one data point of the plurality of data points is present along a vertical line which intersects a point on the horizontal axis, the corresponding horizontal data presence indicator is displayed in a first format at a position along the horizontal axis where the at least one data point is within the region represented by the vertical scroll bar, and is displayed in a second format at a position along the horizontal axis where the at least one data point is not within the region represented by the vertical scroll bar,
wherein, when at least one data point of the plurality of data points is present along a horizontal line which intersects a point on the vertical axis, the corresponding vertical data presence indicator is displayed in a third format at a position along the vertical axis where the at least one data point is within the region represented by the horizontal scroll bar, and is displayed in a fourth format at a position along the vertical axis where the at least one data point is not within the region represented by the horizontal scroll bar, and
wherein, at least one horizontal data presence indicator and at least one vertical data presence indicator indicate at least one position of at least one data point in the graph, when the at least one data point is not visible within the graphical user interface.

* * * * *